(No Model.)

D. ERICKSON.
SINKER FOR FISH NETS.

No. 286,188. Patented Oct. 9, 1883.

WITNESSES:
Adam Geo. White
Louis Nolting

INVENTOR
Daniel Erickson
BY Wm H Lotz
ATTORNEY

United States Patent Office.

DANIEL ERICKSON, OF CHICAGO, ILLINOIS.

SINKER FOR FISH-NETS.

SPECIFICATION forming part of Letters Patent No. 286,188, dated October 9, 1883.

Application filed March 24, 1883. (No model.)

*To all whom it may concern:*

Be it known that I, DANIEL ERICKSON, of Chicago, in the county of Cook and State of Illinois, have invented certain new and useful Improvements in Sinkers for Fishing-Nets; and I do hereby declare that the following is a full, clear, and exact description thereof, reference being had to the accompanying drawings, and to the letters of reference marked thereon, which form a part of this specification.

Heretofore sinkers have either been formed of certain definite lengths and tubular, their only method of attachment to the lines or nets being to string them thereon before knotting the line to the net, or by splitting shot with a chisel or a knife and then placing them on and pinching the open edges over the line. In each of these constructions fishermen are confined to the use of such sizes of sinkers only as are to be found in the market.

My invention consists in forming cylindrical sinkers with a deep longitudinal groove or slit, enlarged at its bottom, into which the line or cord is laid and secured by contracting the outer edges of such groove, either by compression or hammering, so as to be able to secure the sinkers before or after the sinker-line is knotted to the net, and in drawing or rolling such sinker-lead in continuous rods that have the above shape, and can be sold in coils or by the yard, and can be cut off by the fishermen to form sinkers of various lengths and suitable weights, as they may require them on different nets, all as more fully hereinafter described and specifically claimed.

Figure 1:
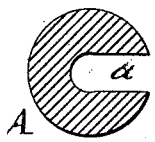
Figure 2:
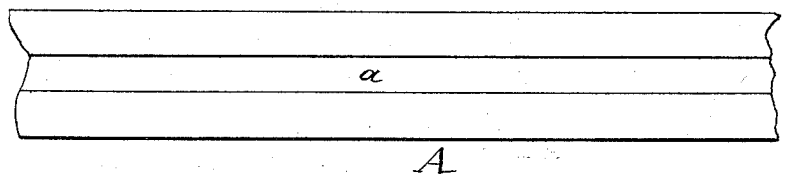
Figure 3:
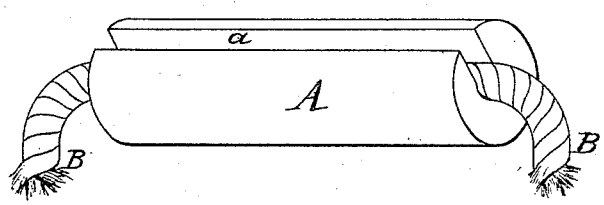
Figure 4:

In the accompanying drawings, Figure 1 represents a cross-section, and Fig. 2 an elevation, of the sinker-lead. Fig. 3 represents a perspective view of a sinker with the line placed in its groove, but not secured; and Fig. 4, a cross-section of the sinker after securing it to the net-line.

Corresponding letters in the several figures of the drawings designate like parts.

A denotes the cylindrical rod of lead having the longitudinal groove *a*, said groove being of any suitable width, and in depth extending to about the center of the bar A. At its bottom this groove is enlarged and becomes semi-circular in cross-section, by means of which construction a more certain and reliable receptacle for the rope B is formed, the edges of the slot *a* can be brought together more closely than in ordinary split shot, and the sinker can be more readily adjusted on the line. This bar is cut up to the desired lengths for the sinkers with a chisel, knife, or saw. B is a piece of the line that forms the lower edge of the fishing-net, that is placed longitudinally into the bottom of such groove *a*, and is secured by contracting the mouth of the groove, either with a suitable pinchers by compressing, or with a mallet by hammering. For removing the sinker from the line again such groove *a* can be opened with a chisel or other suitable tool, and without damaging the sinker for future use.

The advantages of the above improvements will be readily seen.

I am aware that sinkers have been constructed of shot, which have been partly split by means of a knife or chisel and fastened to the line by pinching the split portion thereon. I do not claim such an arrangement. My improvement consists in forming cylindrical sinkers of continuous length or coils, and with a deep longitudinal groove, of a width sufficient, as shown in the drawings, to permit the line to rest therein. By making the sinkers in continuous length or coil several advantages are secured over the split shot—to wit, a fisherman can more readily and availably carry a continuous length than he could a number of separate shot. Then he can cut off from the length or coil a sinker of the exact weight required. He does not have to attach to the line a number of separate pieces. Again, by forming in the cylindrical sinker a deep longitudinal groove wide enough to receive the line and allow it to rest therein the line can be readily placed within such grooves, and, if need be, slid along the line with ease whenever necessary.

What I claim is—

As a new article of manufacture, a sinker for fishing-nets, composed of a cylindrical bar of lead provided with a slot, *a*, enlarged at its bottom, as and for the purpose set forth.

In testimony that I claim the foregoing as my invention I affix my signature in presence of two witnesses.

DANIEL ERICKSON.

Witnesses:
 LOUIS NOLTING,
 ADAM GEO. WHITE.